(12) United States Patent
Lewis et al.

(10) Patent No.: US 12,717,088 B2
(45) Date of Patent: Aug. 25, 2026

(54) MARINE LIDAR SYSTEM

(71) Applicant: Garmin International, Inc., Olathe, KS (US)

(72) Inventors: Robert A. Lewis, Flagstaff, AZ (US); Joseph R. Bietry, Rochester, NY (US); Heidi L. Hall, Webster, NY (US)

(73) Assignee: Garmin International, Inc., Olathe, KS (US)

( * ) Notice: Subject to any disclaimer, the term of this patent is extended or adjusted under 35 U.S.C. 154(b) by 355 days.

(21) Appl. No.: 18/494,715

(22) Filed: Oct. 25, 2023

(65) Prior Publication Data

US 2024/0264382 A1 Aug. 8, 2024

Related U.S. Application Data

(60) Provisional application No. 63/482,830, filed on Feb. 2, 2023.

(51) Int. Cl.

| | |
|---|---|
| ***G02B 6/35*** | (2006.01) |
| ***G01S 7/481*** | (2006.01) |
| ***G01S 17/88*** | (2006.01) |
| ***G02B 26/08*** | (2006.01) |

(52) U.S. Cl.

CPC .......... *G02B 6/3516* (2013.01); *G01S 7/4817* (2013.01); *G01S 17/88* (2013.01); *G02B 26/0833* (2013.01); *G02B 26/0891* (2013.01)

(58) Field of Classification Search

None

See application file for complete search history.

(56) References Cited

U.S. PATENT DOCUMENTS

| | | | | |
|---|---|---|---|---|
| 6,250,763 | B1 * | 6/2001 | Fielding ............ | G02B 26/0833 353/31 |
| 8,125,620 | B2 | 2/2012 | Lewis | |
| 8,994,925 | B2 | 3/2015 | Lewis | |
| 9,335,403 | B2 | 5/2016 | Lewis | |
| 9,581,684 | B2 | 2/2017 | Lewis | |
| 9,658,322 | B2 | 5/2017 | Lewis et al. | |

(Continued)

OTHER PUBLICATIONS

U.S. Appl. No. 18/494,718, filed Oct. 25, 2023.

*Primary Examiner* — Shan Liu

(74) *Attorney, Agent, or Firm* — Samuel M. Korte; Max M. Ali; Kathleen D. Fitterling

(57) ABSTRACT

An ultra-compact optical receiver supporting the laser scanning of objects in three-dimensions is disclosed. The receiver's narrow field-of-view may track the movement of a transmit beam, allowing isolation of a reflected receive signal from sensitivity reducing solar background and interfering signals. Small portions of a full receive field may be selected using a Digital Light Projector (DLP) micromirror array by placing a small portion of the mirror array elements into a "pass-state" allowing light to be directed towards the optical detector. The remaining mirror elements can be placed into a "dump state" where light is directed away from the detector. Furthermore, a unique total internal reflection (TIR) prism configuration may be used to allow the incoming receive signal to pass directly to the DLP mirror array while directing the light from pass and dump state DLP mirror orientations to the detector or optical absorbing regions of the receiver respectively.

20 Claims, 15 Drawing Sheets

(56) References Cited

U.S. PATENT DOCUMENTS

| | | | | |
|---|---|---|---|---|
| 10,466,343 | B2 | 11/2019 | Lewis | |
| 10,653,937 | B2 | 5/2020 | Lewis et al. | |
| 11,550,059 | B2 | 1/2023 | Lewis | |
| 11,745,082 | B2 | 9/2023 | Lewis et al. | |
| 2012/0038819 | A1* | 2/2012 | McMackin ............ | H04N 25/00 348/E5.024 |
| 2015/0260831 | A1 | 9/2015 | Lewis | |
| 2015/0378023 | A1* | 12/2015 | Royo Royo ............ | G01S 17/89 356/5.01 |
| 2021/0088667 | A1 | 3/2021 | Heling et al. | |
| 2021/0272998 | A1* | 9/2021 | Takeuchi ................. | G01V 8/18 |
| 2023/0356060 | A1 | 11/2023 | Lewis et al. | |

* cited by examiner

200

| PARAMETER | SYMBOL | CONDITION | MIN. | TYP. | MAX. | UNIT |
|---|---|---|---|---|---|---|
| SPECTRAL RESPONSE RANGE | $\lambda$ |  | - - | 440 to 1100 | - - | nm |
| PEAK SENSITIVITY WAVELENGTH | $\lambda P$ | M=100 | - - | 860 | - - | nm |
| PHOTO SENSITIVITY | S | $\lambda$=900nm, M=1 | - - | 0.52 | - - | A/W |
| QUANTUM EFFICIENCY | QE | $\lambda$=900nm, M=1 | - - | 72 | - - | % |
| BREAKDOWN VOLTAGE | $V_{BR}$ | $I_D$=100$\mu$A | - - | 250 | - - | V |
| TEMPERATURE COEFFICIENT OF $V_{\beta R}$ | $\Delta TV_{BR}$ |  | - - | 1.85 | - - | V/°C |
| DARK CURRENT | $I_D$ | M=100 | - - | 0.8 | - - | NA |
| CUT-OFF FREQUENCY | fc | M=100, RL=50$\Omega$<br>$\lambda$=900nm, -3dB | - - | 350 | - - | MHZ |
| TERMINAL CAPACITANCE | CT | M=100,F=1MHz | - - | 3.6 | - - | PF |
| EXCESS NOISE FIGURE | X | $\lambda$=900nm, M=100 | - - | 0.3 | - - | - - |
| GAIN | M | $\lambda$=900nm | - - | 100 | - - | - - |

FIG. 2

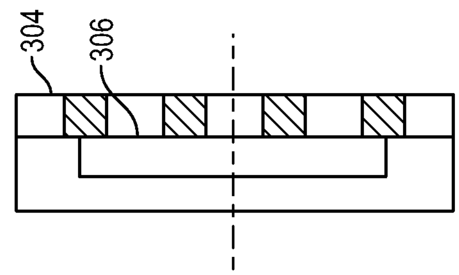
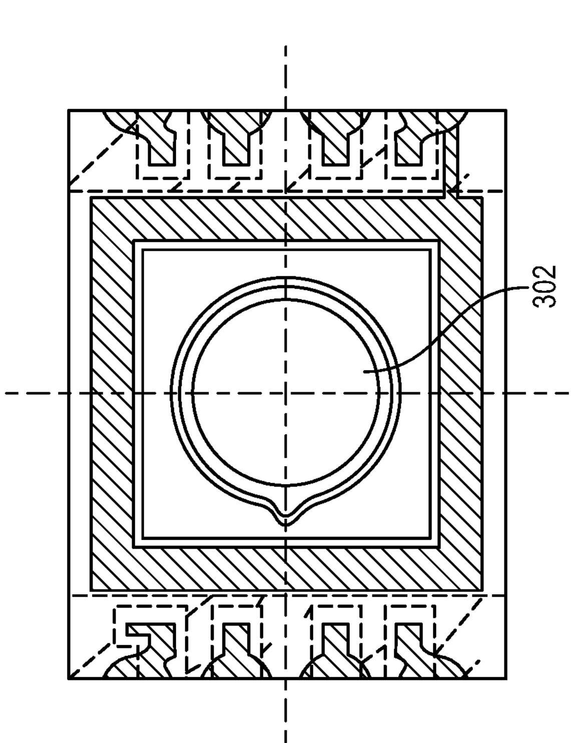
300

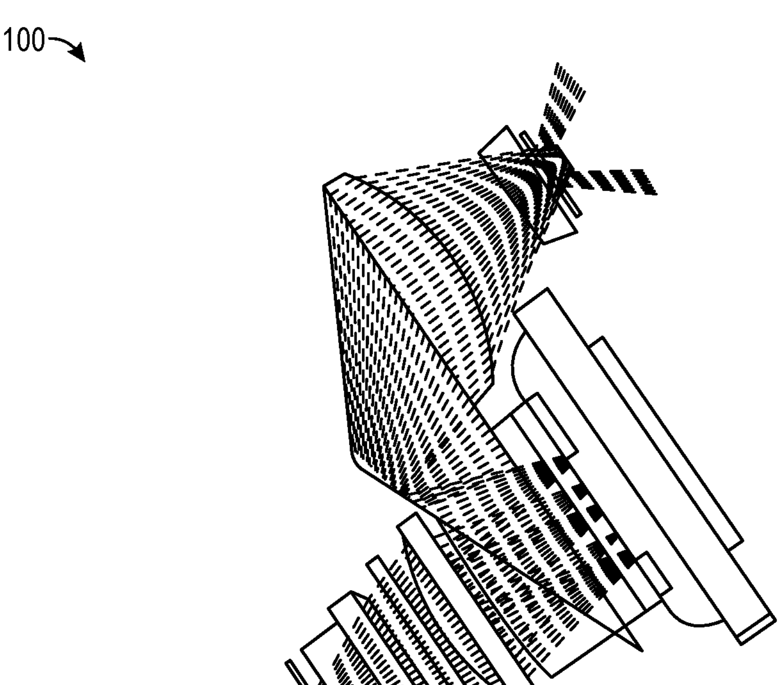
NEW APPROACH:
INCOMING SIGNAL PASSES DIRECTLY THROUGH THE TIR PRISM PAIR
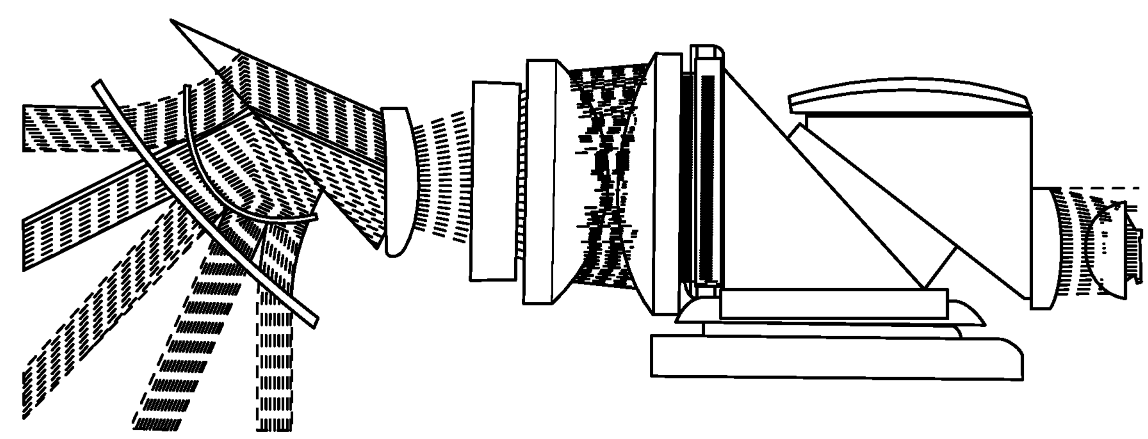
CONVENTIONAL APPROACH:
INCOMING SIGNAL REFLECTS OFF TIR PRISM SURFACE
FIG. 9

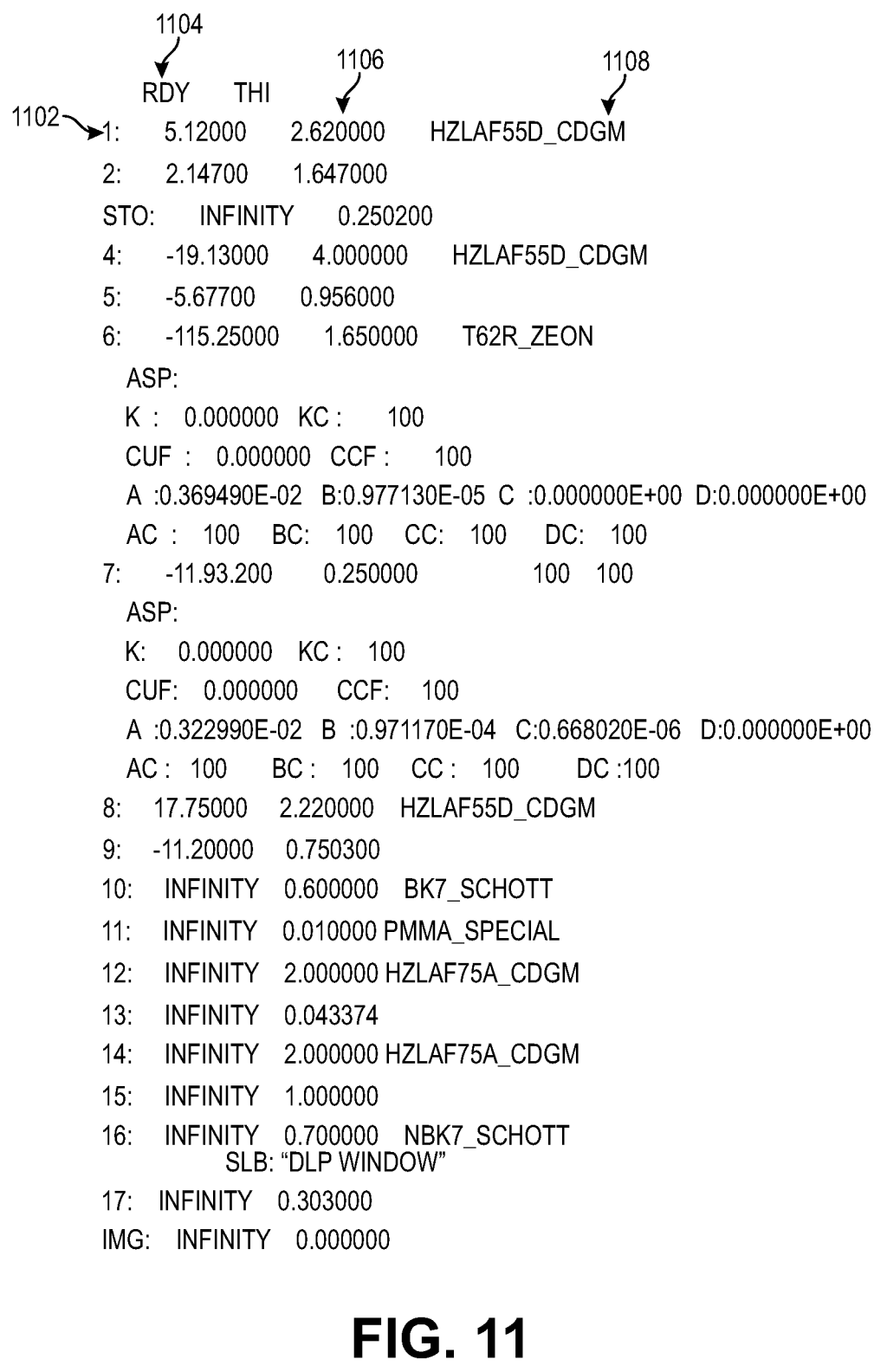

1104 1106 1108

RDY THI

1102

1: 5.12000 2.620000 HZLAF55D_CDGM
2: 2.14700 1.647000
STO: INFINITY 0.250200
4: -19.13000 4.000000 HZLAF55D_CDGM
5: -5.67700 0.956000
6: -115.25000 1.650000 T62R_ZEON
ASP:
K : 0.000000 KC : 100
CUF : 0.000000 CCF : 100
A :0.369490E-02 B:0.977130E-05 C :0.000000E+00 D:0.000000E+00
AC : 100 BC: 100 CC: 100 DC: 100
7: -11.93.200 0.250000 100 100
ASP:
K: 0.000000 KC : 100
CUF: 0.000000 CCF: 100
A :0.322990E-02 B :0.971170E-04 C:0.668020E-06 D:0.000000E+00
AC : 100 BC : 100 CC : 100 DC :100
8: 17.75000 2.220000 HZLAF55D_CDGM
9: -11.20000 0.750300
10: INFINITY 0.600000 BK7_SCHOTT
11: INFINITY 0.010000 PMMA_SPECIAL
12: INFINITY 2.000000 HZLAF75A_CDGM
13: INFINITY 0.043374
14: INFINITY 2.000000 HZLAF75A_CDGM
15: INFINITY 1.000000
16: INFINITY 0.700000 NBK7_SCHOTT
SLB: “DLP WINDOW”
17: INFINITY 0.303000
IMG: INFINITY 0.000000

FIG. 11

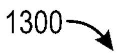
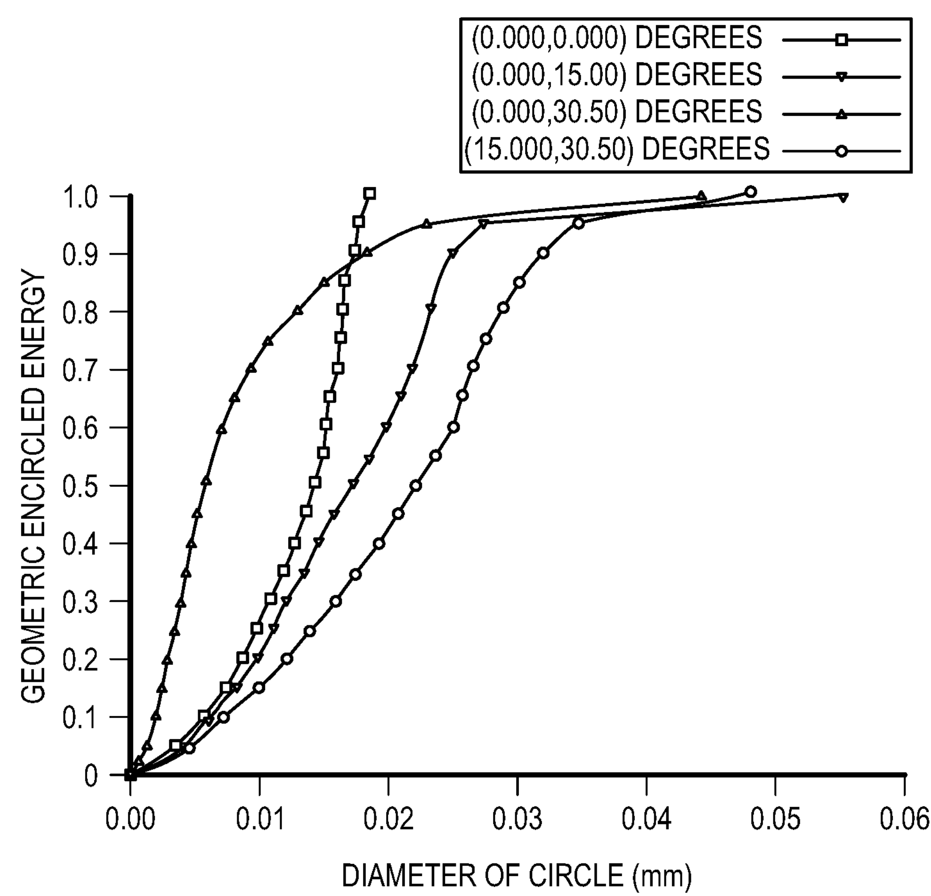
FIG. 13

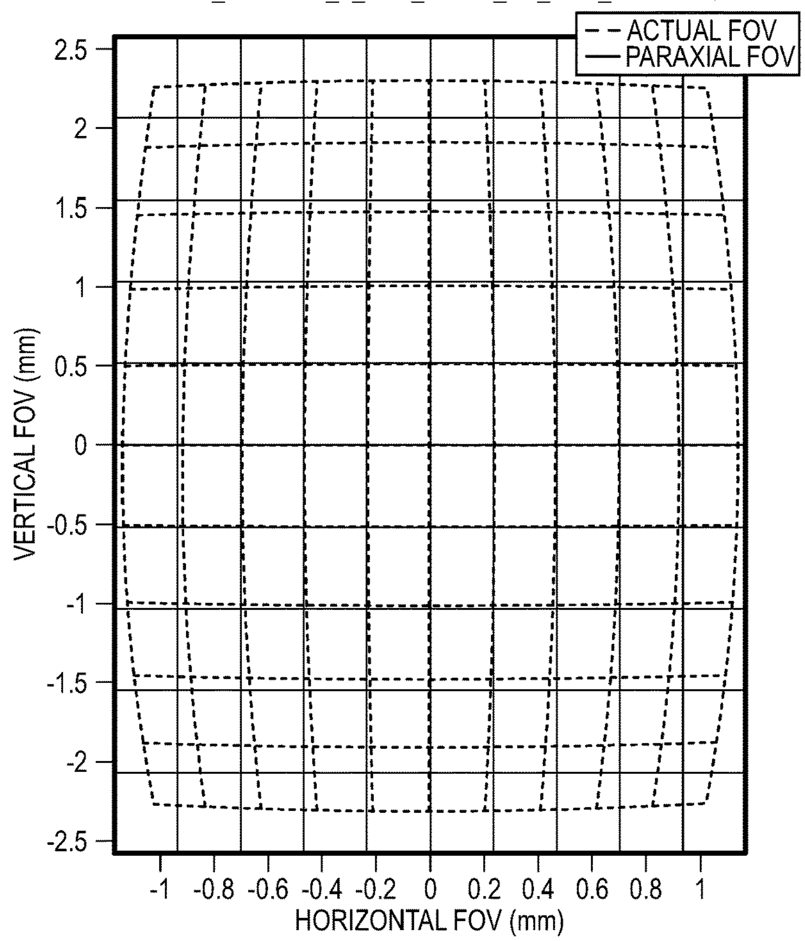
FIG. 14
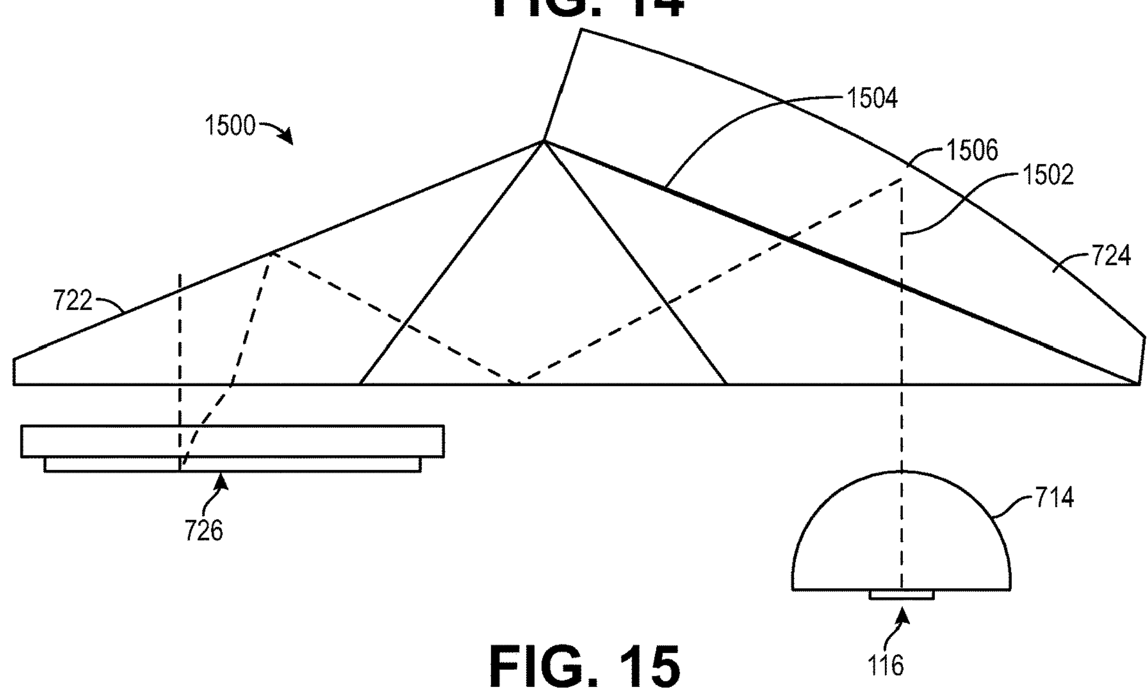
FIG. 15

MARINE LIDAR SYSTEM

RELATED APPLICATIONS

This non-provisional patent application claims priority benefit, with regard to all common subject matter, of earlier-filed U.S. Provisional Patent Application No. 63/482,830, filed Feb. 2, 2023, and entitled "MARINE LIDAR SYSTEM." The identified earlier-filed provisional patent application is hereby incorporated by reference in its entirety into the present application.

BACKGROUND

Marine Lidar systems are used for a wide range of applications including surveying the topography of the ocean floor. The marine Lidar systems may be used in industries such as oil and gas as well as oceanographic industries. However, there are obstacles that must be overcome and drawbacks to current marine Lidar systems. For example, typically, solar radiation illuminating the background scene viewed by a wide-angle lidar system is one of the primary limiting factors driving system performance. At the photo detector, collected solar energy within the detector field-of-view and optical passband is converted to Direct Current (DC), which in turn generates broadband shot noise potentially reducing the sensitivity of the receiver. The field of coverage is typically defined by a solid angle or steradian (srad) unit which is related to the proportion of the surface area of a unit sphere subtended by an angularly defined region. Typical required receive field-of-view of 30 by 60 degrees corresponds to a solid angle of 0.5 steradians (srad). Assuming an effective receive aperture of 2.4 mm and the use of an avalanche photodiode needed for maximum sensitivity and range, a maximum field of view of 0.001 srad is necessary to allow the avalanche photodiode (APD) to operate at maximum gain. A receive solid angle roughly 500 times smaller than the full field of receiver coverage is necessary to obtain maximum performance.

Many scanning lidar systems use micro-electromechanical systems (MEMS) scanning mirrors on both the transmitter and receiver to allow a narrow field-of-view receiver to track the movement of the narrow transmit beam. This approach allows the receiver to have a sufficiently narrow field-of-view and correspondingly small collection solid angle to minimize the impact of solar background. Unfortunately, a Lidar system's range is often limited due to the resulting small effective size of the receive aperture. The combination of a small MEMS mirror diameter and the use of field expanding optics produce an effective mirror diameter often less than 1 mm.

MEMS scanning mirrors are typically one-to-two millimeters in diameter to minimize mirror inertia and to increase the mirror's self-resonance frequency to allow rapid scanning. The most common diameter is on the order of 1 mm corresponding to self-resonance frequencies of 10 KHz or more to enable operation at video resolutions and frame rates. For a highly collimated single-mode laser used as a transmit source, a beam diameter of 1 mm or less can still allow a beam divergence of only a few milliradians.

MEMS mirrors can also have a relatively small angular beam scanning range, typically on the order of 30 degrees or less, thus requiring a field expanding optic to extend coverage. Applied in the receiver however, a 1 mm diameter MEMS mirror with a two-fold field expanding optic (needed to obtain 60 degrees of coverage for example) yields an effective receiver entrance aperture of only 0.5 mm.

An additional limitation on the use of MEMS mirrors with field expanding optics is, if two single-axis mirrors are used, steering of the first mirror in the pair will cause beam displacement off the center-axis at the second mirror significantly impacting beam quality and complexity of the field expanding optical system that follows. The use of a single, two-axis steering mirror, does not experience this limitation, however typically with a smaller angular swing in each axis, more field expansion is required, further reducing the effective aperture of the system.

SUMMARY

The above problems may be solved by providing a receiver system comprising a digital light projector (DLP) mirror array to select a small instantaneous receiver field-of-view. The receiver's narrow field-of-view may track the movement of a transmit beam, allowing isolation of a reflected receive signal from sensitivity reducing solar background and interfering signals. Small portions of the full receive field may be selected using the DLP micromirror array by placing a small portion of the mirror array elements into a "pass-state" allowing rays to be directed towards the optical detector. The remaining mirror elements can be placed into a "dump state" where light is directed away from the detector. Furthermore, a unique total internal reflection (TIR) prism configuration may be used to allow the incoming receive signal to pass directly to the DLP mirror array while directing the light from pass and dump state DLP mirror orientations to the detector or optical absorbing regions of the receiver respectively.

The present disclosure provides a first embodiment directed to a Lidar receiver system, comprising a telecentric receiver lens and a total internal reflection (TIR) prism assembly. The TIR prism assembly comprises an upper right-angle wedge prism including a vertex angle, an upper airgap, and a lower prism. The lower prism comprises a vertex angle less than 30 degrees, wherein the angle is based at least in part on a f-number of the telecentric receiver lens, a material refractive index of a prism material of the lower prism, and an active state mirror deviation angle of a digital light projector (DLP) micromirror module, a reflector adhesively bonded to an inclined face of the lower prism to direct propagating rays from upward to downward towards a bottom face of the lower prism, wherein the lower prism is isosceles triangular shaped, wherein the upper right-angle wedge prism includes an refractive index matching a lower refractive index of the lower prism, a lower airgap below a base surface of the lower prism, said DLP micromirror array configured to direct selected portions of the visual field off-axis towards the right inclined face of the lower prism, and a photodetector configured to collect the propagating rays passing through the bottom face of the lower prism.

A second embodiment is directed to the Lidar receiver system of clause 1, wherein the lower prism is configured to cause convergence of the propagating rays, and wherein the photodetector incorporates a high index half ball shaped immersion lens to concentrate the converging propagating rays to an active region of the detector.

A third embodiment is directed to the Lidar receiver system of the first and/or second embodiments wherein the photodetector comprises an avalanche photodiode for added receiver gain and higher sensitivity.

A fourth embodiment is directed to the Lidar receiver system of any of the third embodiment, wherein the avalanche photodiode is a single-photon avalanche diode (SiPM).

A fifth embodiment is directed to the Lidar receiver system of any of the first through the fourth embodiments, wherein the reflector is fabricated from high index molded glass with a reflected surface.

A sixth embodiment is directed to the Lidar receiver system of any of the first through the fourth embodiments, wherein the reflector comprises a plurality of asymmetric radiuses of curvature.

A seventh embodiment is directed to the Lidar receiver system of any of the first through the fourth embodiments, wherein the reflector is a volume hologram.

An eighth embodiment is directed to the Lidar receiver system of any of the first through the seventh embodiments, wherein the vertex angle of the isosceles triangle is 22.75 degrees based on a receive lens F-number of approximately 1.8, a DLP active state beam deviation angle of approximately 34 degrees and a prism refractive index of approximately 1.882.

A ninth embodiment is directed to the Lidar receiver system of any of the first through the eighth embodiments, wherein the photodetector is mounted to a supporting PCB and connected to the receiver circuitry using a flex circuit allowing three-dimensional movement.

A tenth embodiment is directed to the Lidar receiver system of any of the first through the ninth embodiments, wherein the supporting PCB is attached to a translatable mounting element.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 2 depicts an exemplary embodiment of a lens selection process;

FIG. 3 depicts an exemplary avalanche photodiode for embodiments of the disclosure;

FIG. 9 depicts a size difference between the receiver system and typical systems;

FIG. 11 depicts an optical prescription of the lens surfaces of FIG. 10 for some embodiments;

FIG. 13 depicts an exemplary radial energy plot;

FIG. 14 depicts an exemplary field distortion of receiver lens assembly;

FIG. 15 depicts an exemplary chief ray diagram;

Figure 1:
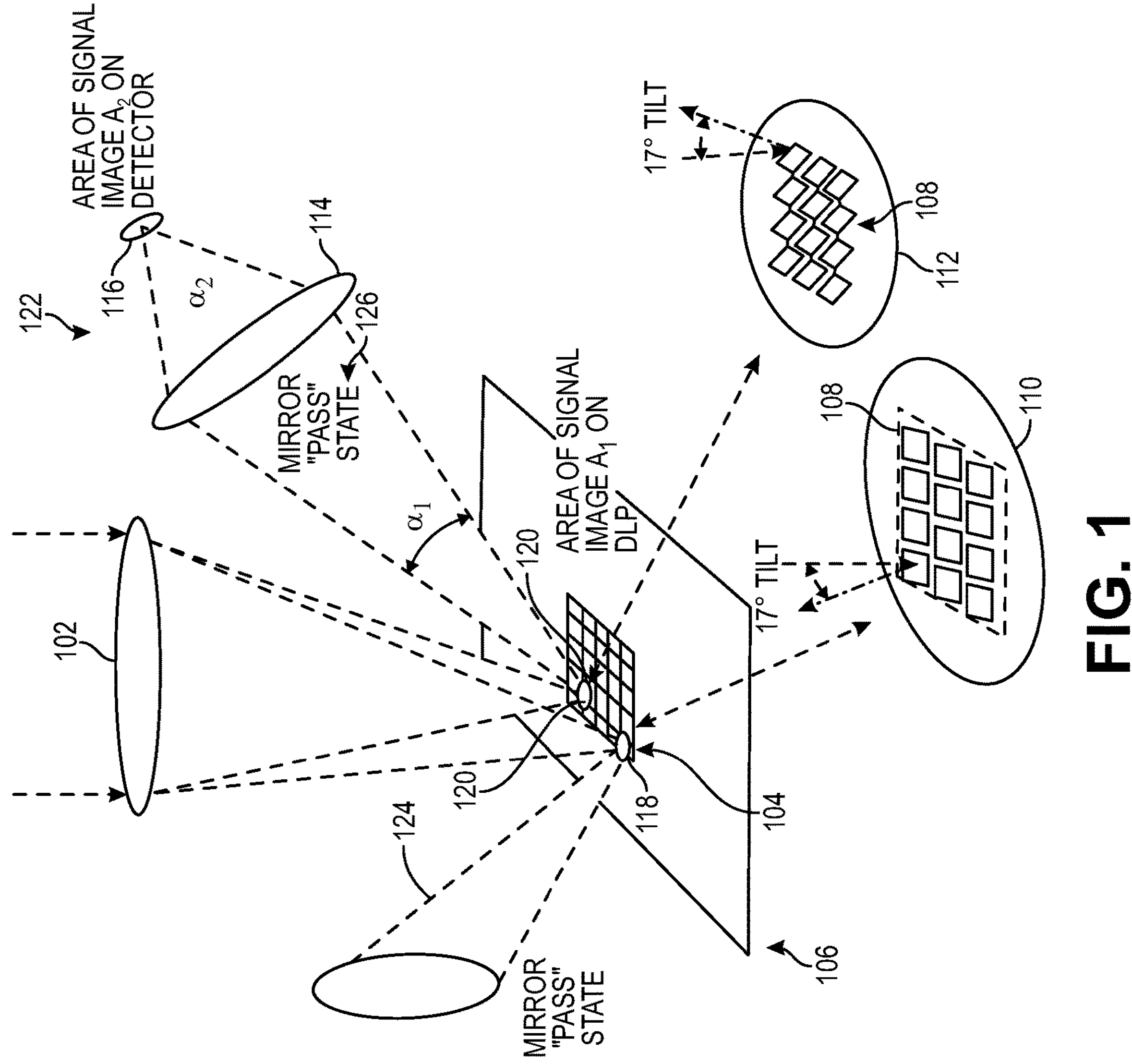
FIG. 1 depicts an exemplary arrangement of a Lidar receiver system.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiment of the Receiver

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

An ultra-compact optical receiver supporting laser scanning of objects in three-dimensions is disclosed. When coupled with a narrow beam laser scanner, the receiver’s narrow field-of-view may track the movement of a transmit beam, allowing isolation of a reflected receive signal from sensitivity reducing solar background and interfering signals from other lidar systems. Using the transmitter beam angular orientation, the receiver controller may select small portions of the full receive field using a Digital Light Projector or DLP micromirror array. The instantaneous field-of-view of the receiver may be selected by placing a small portion of mirror array elements into a “pass-state” allowing light incident on those elements to be directed towards an optical detector. The remaining mirror elements may be placed into a blocking or “dump state” where light is directed away from the detector essentially creating an optical mask with only a small portion of the light from the field passed to the detector. One aspect of this design is the use of a unique total internal reflection or TIR prism configuration to allow the incoming receive signal to pass directly to the DLP mirror array while directing the light from pass and dump state DLP mirror orientations to the detector or optical absorbing regions of the receiver respectively. The TIR prism configuration allows a significant reduction in the size and complexity of the receive lens assembly and the optics required to couple to the receive photodiode.

The following discussion illustrates embodiments of DLP mirror array 104 as a spatial mask. FIG. 1 illustrates an embodiment of receiver system 100. Signal collection lens 102 focuses light on a region of DLP mirror array 104 designated for receiver field selection. Area of the Signal Region A1, effectively represents angular field-of-view and is a direct function of the focal length of the receive lens. The effective F-number or light cone angle follows the size of the lens aperture and is designated as a1.

Signal region on DLP at DLP mirror array 104 comprises mirror elements 108 comprising two angular tilt states. The first "dump state" 110 directs incident light toward a light absorption region to remove light contribution from that portion of the array. The mirror "pass state" 112 directs incoming light towards detector lens 114 which refocuses the energy onto signal detector 116. To allow high frequency operation and to minimize system cost, an area of signal detector 116 may be small relative to DLP signal selection region, or DLP 106. Detector lens 114 may be configured to de-magnify the image projected onto signal detector 116. To allow demagnification, the cone angle of the incident light for signal collection lens 102 may be a relatively high F-number (small light bundle cone angle a1) to allow for cone angle increase when the reduced image is focused onto signal detector 116. Brightness theorem dictates that A1*a1=A2*a2 based on conservation of energy principles. The relation between the angles a1 and a2 are based on the fractional magnification M.

Detector Selection

The below describes an example detector selection process. To meet the Lidar's range requirement, a receiver input aperture of approximately 2.4 mm in diameter may be used. The results of the example selection process are displayed in table 200 of FIG. 2. Based on a typical lens' (e.g., the DLP2010) active area dimensions of approximately 4.61 mm by 2.59 mm and a minimum field of view of approximately 60 by 30 degrees, the receiver lens assembly effective focal length may be roughly 4 mm. Given the entrance aperture of the receiver and the required focal length, a receive system F-number of F #1.8 may be used for best results. Based on this receive f-number, entrance aperture and assuming a maximum collection cone angle into the detector of 60 degrees gives us a theoretical limit on the minimum size of signal detector 116 of 1.2 mm in diameter. Here, an example DLP2010 is used; however, it should be noted that this is an example and the same or similar process for lens selection may be used for any DLP.

FIG. 3 shows specifications for an exemplary 1.5 mm diameter surface mount avalanche photodiode (APD) detector 300. As the light rays propagate from the "pass state" mirror element of DLP mirror array 104 towards signal detector 116, the convergent angle is increased as shown in FIG. 1. In some embodiments, a half-ball lens (e.g., half-ball immersion lens 714, FIG. 7) may be attached to the top of the detector package 122 comprising at least signal detector 116 and detector lens 114 and described in more detail below. Beyond the small size of detector package 122, which may be surface mounted, it may be desirable to eliminate any airgap between the half-ball immersion lens 714 back surface and the detector active area. Off-axis rays at the edge of the converging ray bundle can exhibit total internal reflection or TIR at the interface between the high-index glass of the half-ball immersion lens 714 and air, thus reducing coupling efficiency. APD detector 300 internal gain, low capacitance, and high cut-off frequency may be used to reach the desired system sensitivity and system bandwidth respectively.

Single-Photon Avalanche Diode (SiPM) Embodiment

In some embodiments, signal detector 116 may be APD detector 300. Generally, a variety of single photon sensitive SiPM diode arrays are available from 1 mm square to over 6 mm. In some embodiments, APD detector 300 may be surface mounted. Typically, SiPM diode arrays comprise hundreds of avalanche microcells comprising photosensitive area 302, printed wiring board (PWB) 304, and APD chip 306, further comprising a photon responsive detector, bias resistor, and coupling capacitor. When a photon is detected, the microcell breaks down causing the voltage on the cell to collapse, this collapse in voltage is transferred across the coupling capacitor to the combined outputs of the other cells. The triggering of an individual microcell is followed by a reset process in which the bias resistor recharges the cell. As these microcells trigger and recharge on a random basis, a steady state current is produced which is roughly proportional to the incident illumination.

Under low solar background conditions, the very high internal gain of SiPM diode arrays can produce much higher receive sensitivity than with a conventional APD as discussed in the previous section. As background intensity is increased however, the difference in performance decreases. Under the solar conditions and receiver solid angle as described in embodiments of the present disclosure, sensitivity is only approximately half that of the conventional APD. In some embodiments, where a spatial mask opening solid angle is reduced or the receive aperture is decreased, the SiPM detector can offer improved performance over a standard APD as described below.

Receiver Mask

Figure 4:
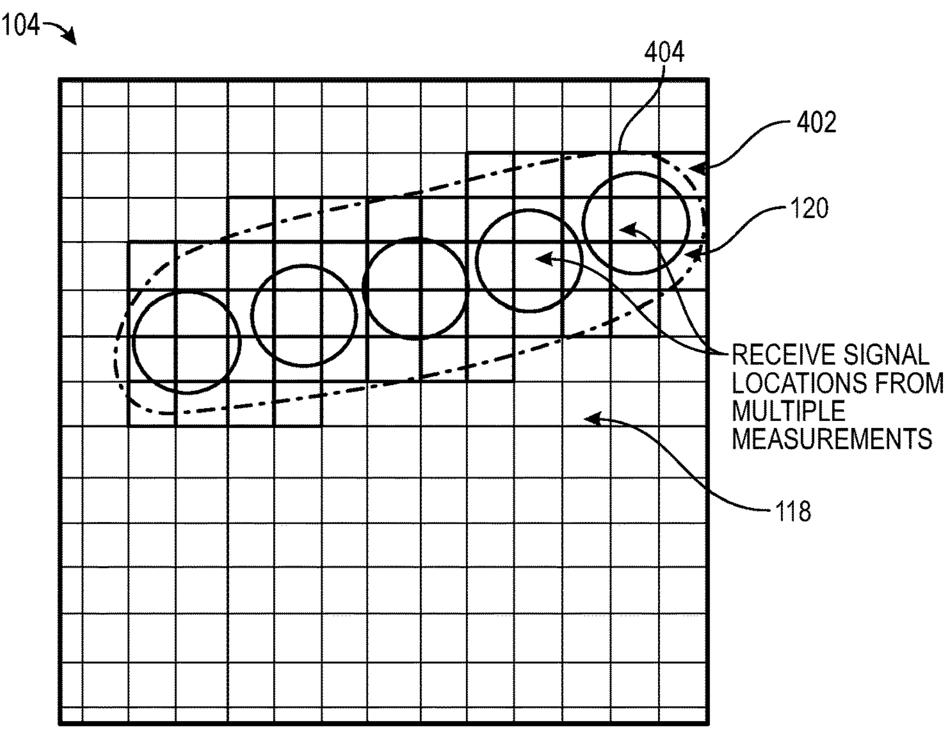
FIG. 4 depict an exemplary mirror field comprising pass and mask states.

Turning now to FIG. 4, in some embodiments, the update rate of DLP 106 may be significantly lower than the measurement rate of receiver system 100. Continuing with the example above, using the selected DLP2010 from Texas Instruments, the maximum frame update rate is 2,500 measurements per second. Thus, it may be useful to create mask openings that follow the trajectory of the scan over multiple acquisitions rather than attempting to move the field with every measurement. FIG. 4 illustrates an example of a spatial mask opening 402 within a portion of DLP mirror array 104 shown in FIG. 1, which in some embodiments may follow an arbitrary scan consisting of multiple acquisition points. Boundary 404 outlining spatial mask opening 402, or DLP mask opening, outlines a desired region of coverage, while the bounded area indicates the associated mirror elements placed into the active "pass-state" 126 to direct energy collected in this region to the photodetector (i.e., signal detector 116).

Mask Opening Solar Background and Noise Calculation

Signal detector 116, which may be a solar background illuminating detector, may produce a DC current, generating shot noise in receiver system 100. Signal detector 116 shot noise in combination with preamplifier noise may set the effective noise floor of the system. The gain process in APD detector 300 may be intrinsically noisy and optimal signal-to-noise ratio may occur when the noise contribution of APD detector 300 matches the noise contribution of the preamplifier. To maintain this noise matching condition, the gain of APD detector 300 may be adjusted by varying its bias voltage, based on measured noise on the output of the preamplifier.

The example calculation below details the set of factors contributing to DC current in APD detector 300 due to solar background assuming a 0.60 by 50 "pass state" DLP mask opening 402.

2.4 mm diameter receiver aperture with an effective receiver area=4.52e-6

Background adjustment=cos $(45)^2$=. 5 (45-degree oriented surface with the sun overhead)

Detector intrinsic responsivity 0.55 A/W @ 830 nm (Prior to APD amplification)

Solar background at sea level @ 830 nm=. 8 W/$m^2$-Å/pi=. 25 W/$m^2$-Å/srad 20 nm filter, 90% transmission=200 Å

Field of view based on DLP update rate and scan rate to support integration count For the solid angle calculation will assume:

DLP Contrast >500:1 (field of 30 by 60 degrees or 0.5 srad needs to contribute less than the scanning window's contribution)

400 KHz burst rate, 2500 DLP frames/see, 2 beams,

Mask Opening Solid Angle: (4*sin (0.3°)*sin)(2.5° *(0.6° by 5°) or 9e-4 srad

Average background reflectivity=50% or 0.5

Receiver Lens and APD optic transmission=81%

DLP transmission @ 830: 60% or 0.6

APD detector 300 current may be calculated from the above parameters in the following equation.

$$I_{opening} = 4.52e-6\ \text{m}^2 * .5 * .55\ \text{A/watt} * .25\ \text{W/m}^2\text{–Å/srad} * 200\ \text{Å} * .9 * 9e{-}4 * .5 * .81 * .6 = .012\ \text{uA}$$

Figure 5:
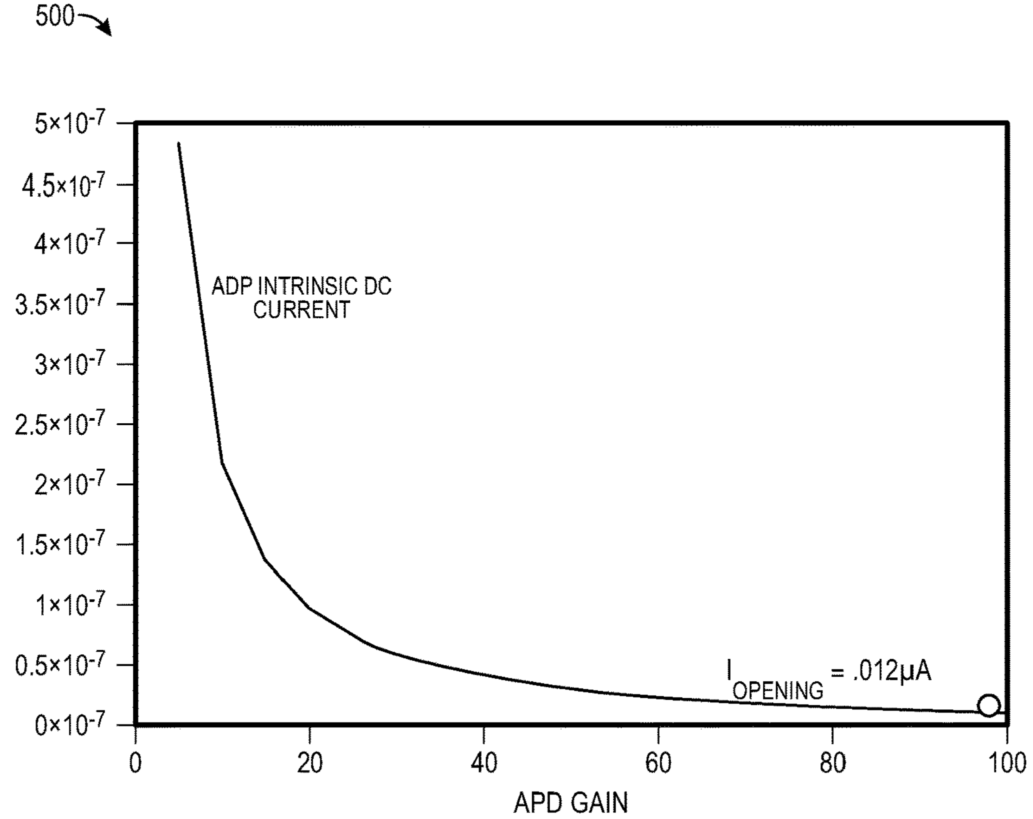
FIG. 5 depicts a result of an embodiment of an APD comprising noise from background solar radiation.

FIG. 5 illustrates a product 500 of a simulation of APD detector 300 noise with increasing direct current due to a solar background. As shown the maximum APD gain that produces output noise matches the following preamplifier. In this example, the preamplifier noise is 1 pA/$Hz^{1/2}$ and the simulation indicates for a detector current of 0.012uA, APD detector 300 can operate at the desired maximum gain of 100 times. The numbers provided here are exemplary and may be different when using different components.

Mask Flexibility and Receiver Capabilities

Figure 6:
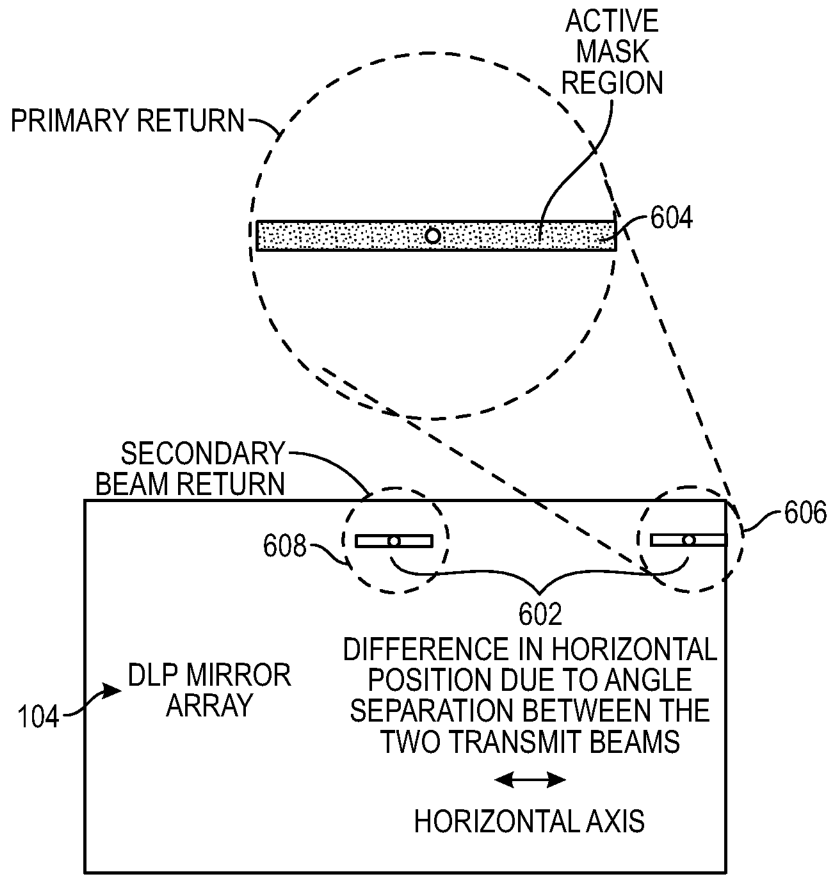
FIG. 6 depicts an exemplary arrangement of a DLP mirror array for some embodiments of the disclosure.

Turning now to FIG. 6, in some embodiments, an aspect of the use of DLP mirror array 104 comprises opening separate apertures to follow multiple beams in the far field. Two or more isolated regions may be activated simultaneously where the time between beam signal returns is too short to allow separate openings or in succession, when the time between beam activations is compatible with the mask update rate of DLP 106. Contrary to MEMS mirrors, which cannot slew instantaneously between disjointed portions of the field, the DLP mirror array 104 has no such limitation. By interleaving the firing of two or more beams, the effective measurement rate or the rate of field coverage can be doubled without significantly impacting system complexity and cost.

FIG. 6 shows representative signal return image locations on the DLP mirror plane due to the use of a mirror-based scanner with two beams incident on the horizontal-axis scanning mirror. In this example, the two beam's horizontal angular offset 602 may be equal to the scanner's beam steering range and mirror 604 may be steered close to the far right of its angle of coverage. The beam return on the right edge 606 of the field is shown in the middle of its mask window. A second mask opening 608, slightly offset to the left of the center of the field, may capture the energy from the second beam. For maximum sensitivity under bright background field conditions, the total solid angle of the two mask openings (e.g., spatial mask opening 402 and second mask opening 608) may be smaller than the 1 milli-steradian used in the single mask opening example.

Receiver Design

Figure 7:
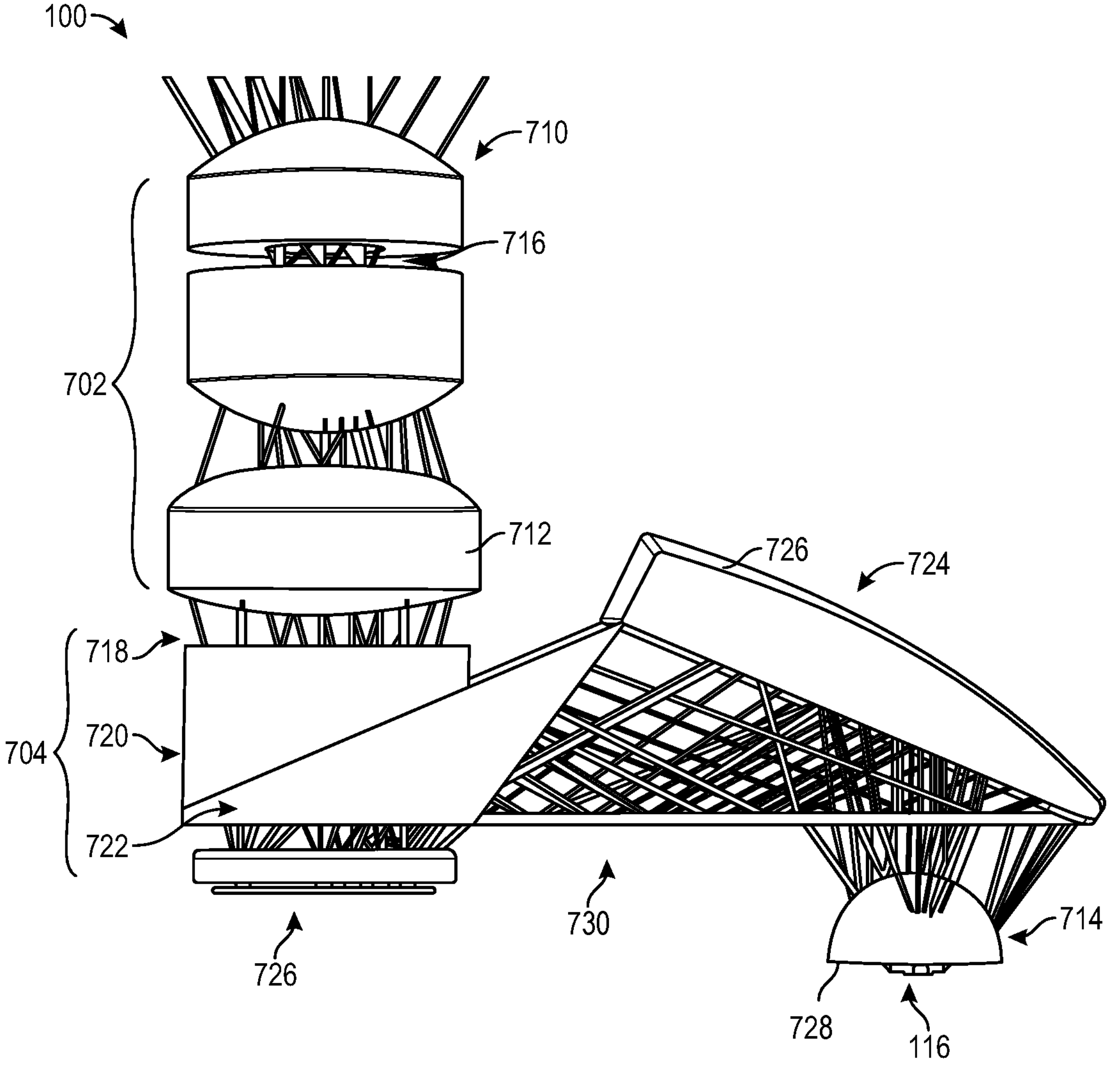
FIG. 7 depicts a side view of the receiver system.

As shown in FIG. 7, in some embodiments, receiver system 100 comprises four functional groupings, a receiver lens assembly 702, a DLP based optical mask (as described above) and associated TIR prism pair 704, detector light collection optic, and the APD based optical receiver. FIG. 7 shows a side view of receiver system 100. Beginning at the top left of FIG. 7 is an assembly comprising four lenses, the first two glass 710; the third, aspheric plastic compensator 712 and the fourth, a glass element (half-ball immersion lens 714). Between the first and second lenses may be entrance pupil 716 of the receiver lens assembly 702. In some embodiments, the diameter of entrance pupil 716 may be 2 mm and may define the effective collection F-number for receiver system 100. Collectively, the lenses form a high-quality, telecentric, wide field image at the surface of the DLP mirror array 104.

On the top of the DLP upper total Internal reflection (TIR) prism, DLP prism stack, an optical bandpass filter 718 may be adhesively bonded. In some embodiments, the DLP prism stack, or prism pair 704, comprises upper TIR prism 720 and lower TIR prism 722 which separate the downward propagating light from the receiver lens assembly 702 from the deviated light reflected upwards from the pass-state mirrors 120 of DLP 106 as shown in FIG. 1. DLP 106 comprises thousands of micro-mirrors with two orthogonal angular tilt states as described above. Dump-state 124 may direct light away from the detector path while the pass-state deviates the reflected return signal towards the detector package 122. Light from dump-state 124 I may be steered in an orthogonal direction to the pass-state 126, directing the energy back out towards the receive lens cell where the energy is absorbed in aperture stops and along the cell wall. An air gap between the high-index upper TIR prism 720 and lower TIR prism 722 may cause the light deviated from the pass-state mirrors 120 to experience total internal reflection or TIR. The interface between upper TIR prism 720 and the isosceles triangle shaped lower TIR prism 722, in some embodiments, may be approximately 22.75 degrees, which may be necessary to achieve a TIR condition for the pass-state rays in the high-index glass material. In some embodiments, the angle may be in a range of 20 degrees to 25 degrees. The DLP 106 pass-state 126 light may reflect off of the prism top surface traveling downwards, off of the bottom of the lower TIR prism 722, and then up toward the condenser reflector 724.

In some embodiments, the detector light collection path begins with condenser reflector 724, which may be bonded with optical adhesive to the right side of lower TIR prism 722. Light from lower TIR prism 722 passes into condenser reflector 724 where, at its back surface, a metalized coating reflects the rays downward towards lower TIR prism base 730. In some embodiments, condenser reflector 724 may be fabricated from a high index moldable glass and has an anamorphic surface with different curvatures (e.g., asymmetric radius of curvature) between the long and short axis of the lens to improve detector collection efficiency. These downward converging rays pass out of the bottom surface of the lower TIR prism 722 where they are collected and focused on to signal detector 116 using a sapphire, half-ball Immersion lens 714. The bottom surface 728 of half-ball immersion lens 714 may be coupled to the encapsulated, surface mounted detector package 122 comprising signal detector 116 using optical potting material to prevent TIR losses between the high-index sapphire and the relatively low-index of the surface mount encapsulant of detector package 122. For example, the high-index sapphire may have an index of refraction of approximately 1.76-1.77, as compared to the index of refraction of approximately 1.46 for silica glass or an index of refraction od approximately 1.3 to 1.4 for some optical polymers. Broadly, for the sake of the instant disclosure, a high-index material has an index of refraction above approximately 1.5.

In some embodiments, APD receiver comprises a 1.5 mm diameter APD, preamplifier and threshold detector. The output of the threshold detector passes from the preamplifier PCB to the main processor board where the signal is processed by a custom field programmable gate array (FPGA).

TIR Prism Pair

Figure 8:
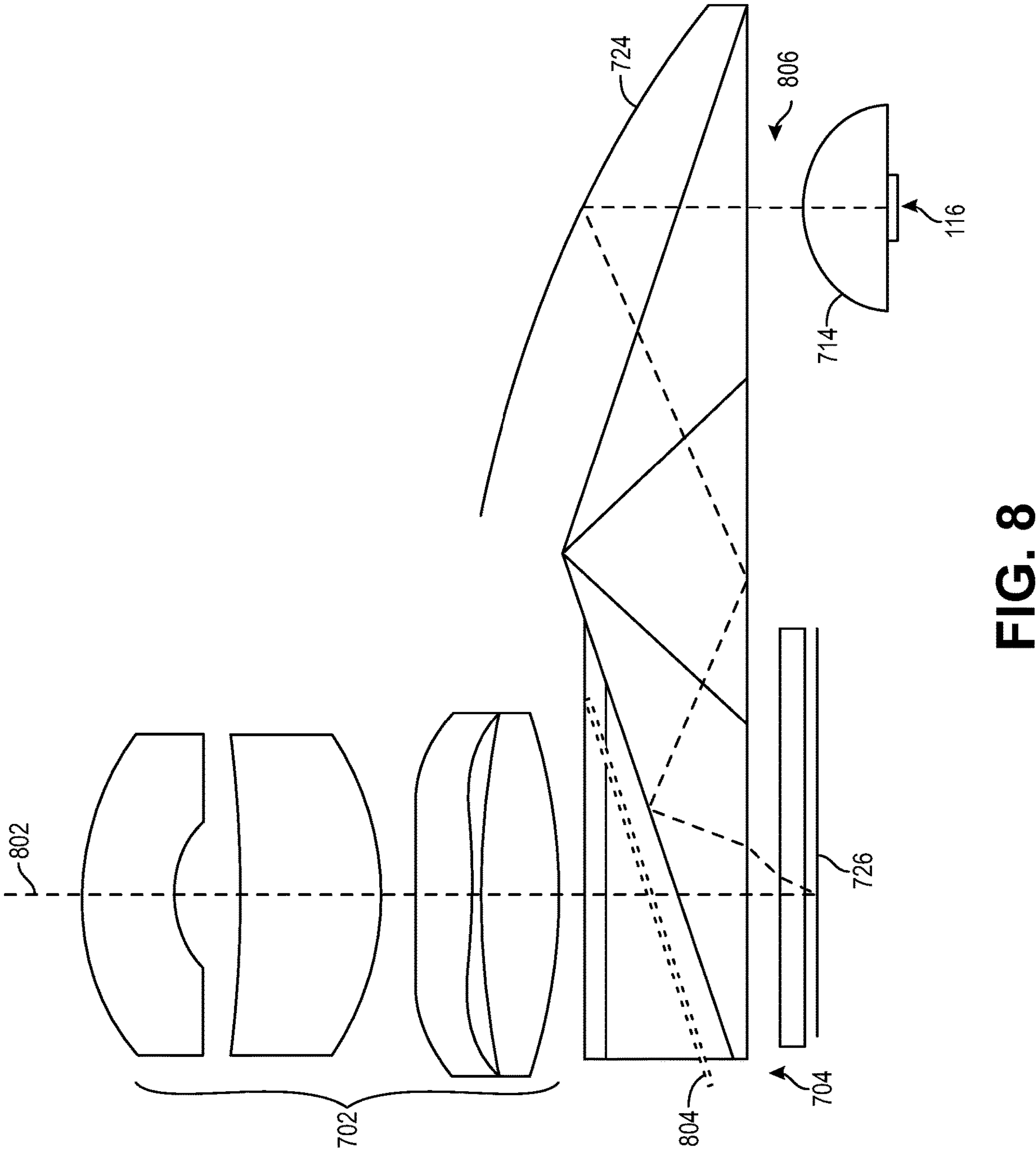
FIG. 8 depicts a central optical path through the receiver system.

FIG. 8 shows an exemplary axial chief ray trace 802 or the central optical path through receiver system 100. A key aspect of the design of receiver system 100 is the use of a prism pair 704 (e.g., upper TIR prism 720 and lower TIR prism 722) with the TIR interface 804 at a shallow angle allowing the received signal from receiver lens assembly 702 to pass directly through without deviation. The use of high-index glass for prism pair 704 combined with the straight transmission path of axial chief ray trace 802 allows a short effective optical path length. The short effective distance from the first element of the receive lens assembly to the DLP module 726 allows a significant reduction in the size and complexity of the receive lens assembly.

A ramification of the shallow prism TIR angle of TIR interface 804 is that light deviated off-axis due to the active "on-state" of the DLP mirror array 104 is reflected off of TIR interface 804 downward towards the back surface of lower TIR prism 722. This behavior may create a problem because light exiting lower TIR prism 722 at that point would be blocked by the DLP module 726 located below. This design takes advantage of the above-described behavior by reflecting the downward propagating light off of a TIR surface produced by maintaining a lower air gap 806 along the backside of lower TIR prism 722. Once the light is directed upwards, it can be focused and directed downward to signal detector 116 on the opposite side of the prism pair 704.

FIG. 9 illustrates a relative size difference between a conventional DLP receiver 902 designed using a reflective signal path prism configuration and to the left an embodiment of the current disclosure of the receiver system 100 with the receive signal passing directly through the prism pair. It can be seen that the receiver system 100 is much more compact than the illustrated conventional DLP receiver 902.

Receiver Optical Design Discussion

Figure 10:
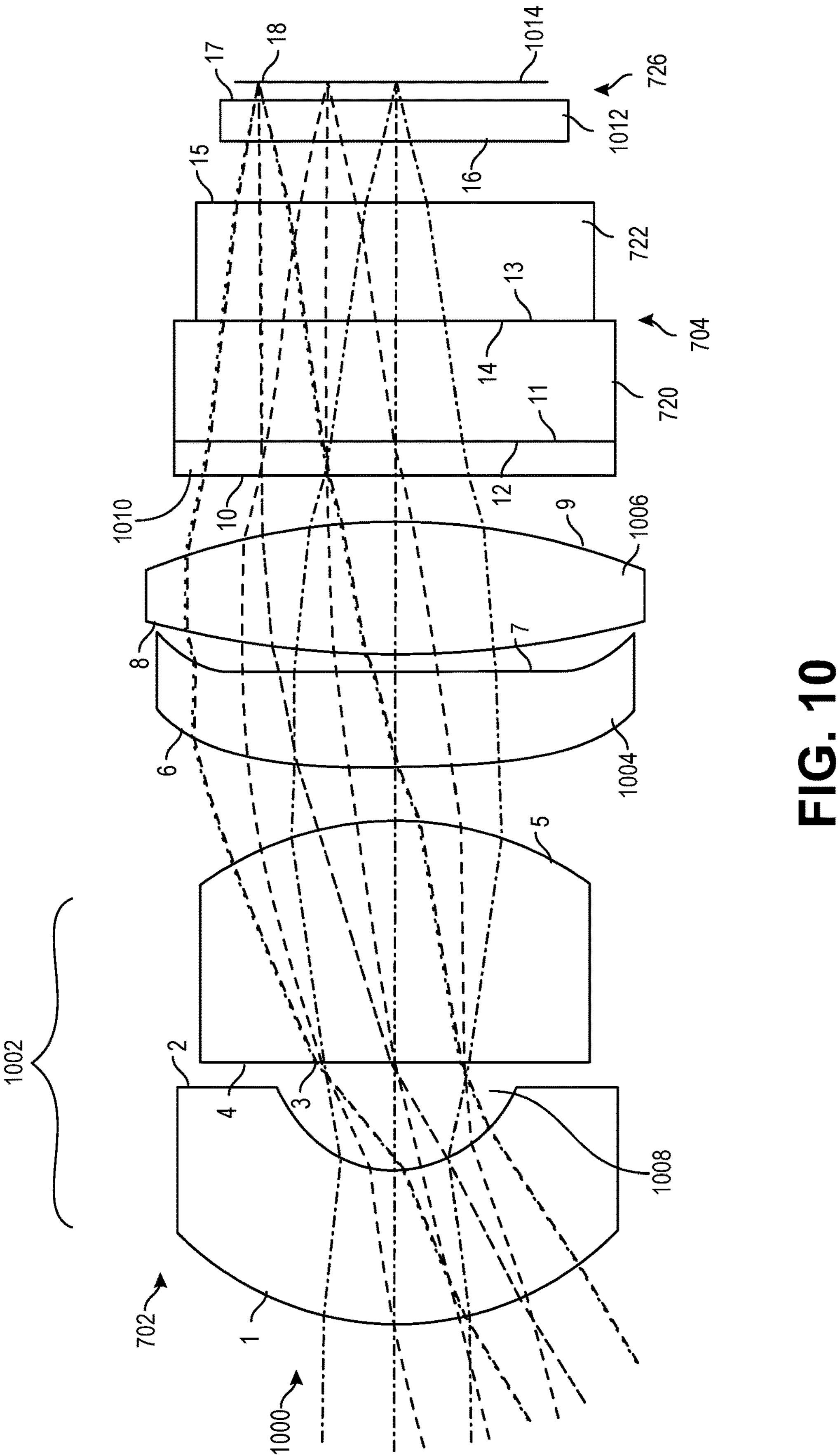
FIG. 10 depicts an exemplary ray tracing simulation.

FIG. 10 shows an embodiment of raytracing simulation 1000 of the receiver lens assembly 702. Beginning from the left, the top two lenses 1002 may be glass with spherical surfaces while the third optical lens element 1004 may be plastic with complex aspheric surfaces on both sides of the lens. The fourth lens element 1006 may be glass. Between the first two lens elements may be an aperture 1008 which controls the system f-number and the effective input aperture of the system. The third optical lens element 1004 may provide aberration control while the following fourth lens element 1006 may provide optical power. Separating optical power and aberration control significantly reduces thermal and position sensitivity in the receiver lens assembly 702. A glass slab 1010 may be a narrow band optical filter that may be glued to the top of upper TIR prism 720. The elements shown as TIR prism pair 704 represent the path of light through the TIR prism pair 704 with the TIR surface removed. Glass window 1012 and DLP mirror plane 1014 of DLP module 726, as discussed above, are shown.

Optical Listing

Table 2 1100 illustrated in FIG. 11 shows a listing of the optical prescription for the surfaces 1-18 of FIG. 10. The first column 1102 references the surface numbers 1-17, the second column 1104 the radius of curvature, the third column 1106 the separation from the next surface, and the fourth column 1108 the glass type. In the exemplary embodiment shown, glass types HZLAF55D, HZLAF75D have indexes of refraction of 1.819 and 1.882 respectively at the laser wavelength of 830 nm. The glass BK7 filter and the plastic T62R Zeon have roughly the same index at 1.51. All the surfaces except for the back surface of the optical filter, surface 11, have low reflectivity antireflection coatings to minimize transmission loss and to prevent stray light reflections from reducing system contrast.

A thermal analysis of the exemplary design represented by FIGS. 10-11 shows that from twenty-two degrees Celsius to fifty degrees Celsius indicates that the system only changes in back focus by less than seven microns. This level of back focus change is acceptable for this application.

Optical Image Quality

In some embodiments, the primary driver of the image quality requirement for receiver system 100 may be matching the return signal image size to the size of the DLP mask opening 402 as shown in FIG. 4. Because the primary function of the mask of receiver system 100 is to separate the solar illuminated background from the small region around the received signal image; the smallest practical spatial mask opening 402 is desired. The receiver's wide field-of-view, low f-number, and the requirement for a short physical length places limits on the achievable optical quality. Excellent image quality near the center of the field can be achieved; however, performance at the corners of the rectangular field may be difficult with an effective off-axis angle approaching, for example, 35 degrees. An achievable requirement of four milliradians can be established to maintain good collection efficiency assuming a slit of DLP mask opening 402 of eight milliradians or about one-half degree, for example.

Figure 12:
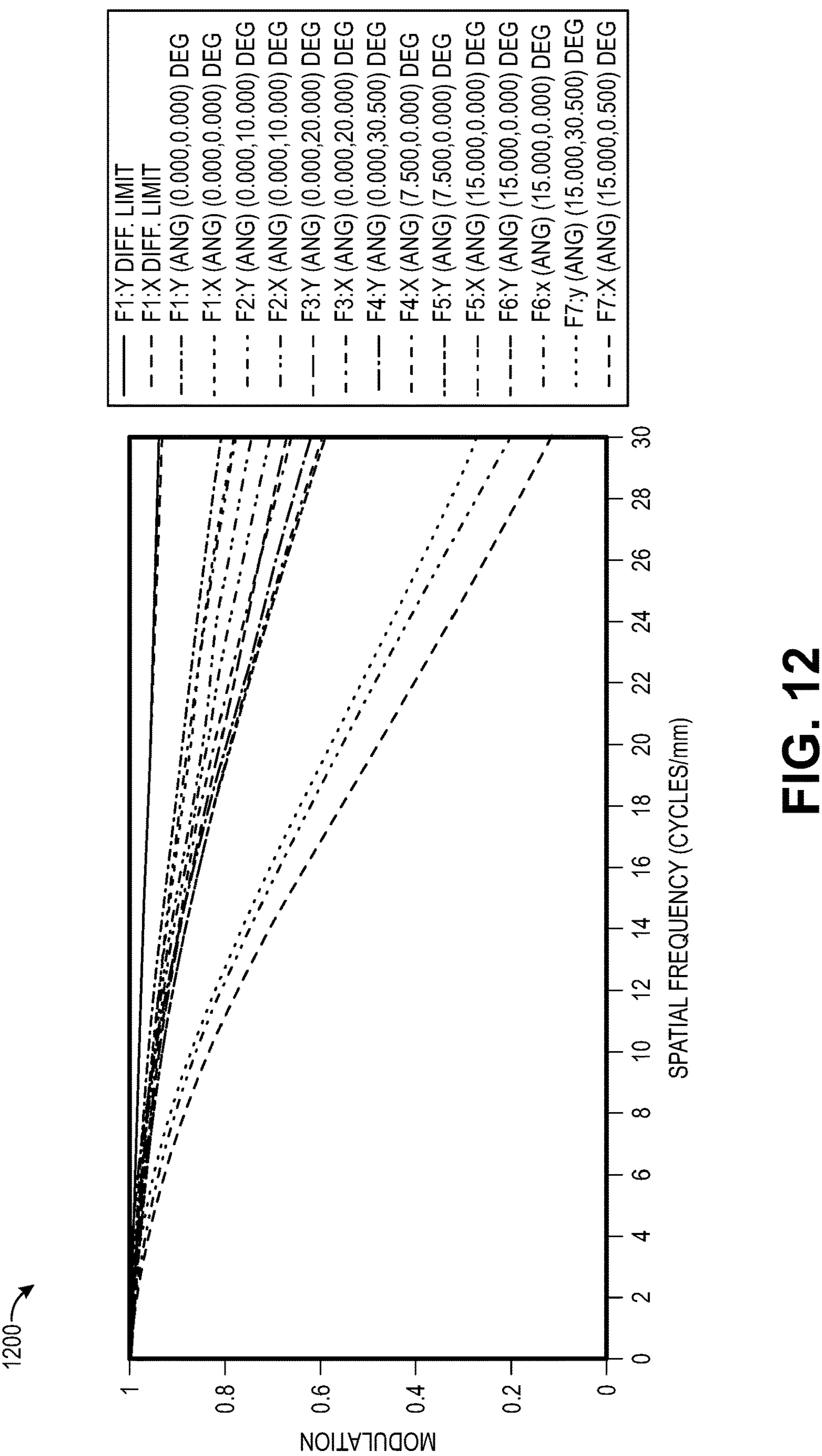
FIG. 12 depicts an exemplary optical simulation results of a modulation transfer function.

Most visual systems characterize optical quality using a measurement parameter known as the modulation transfer function (MTF). The MTF measures the ability of a lens to transfer the contrast of a visual field onto the system image plane. The MTF refers to the spatial frequency or number of line pairs per millimeter that can be resolved. In the exemplary case described above, a 4 mrad spot corresponds to a spatial resolution of twenty-eight-line pairs per millimeter. A MTF of 100% indicates that the intensity of an image spot is not degraded by passing through the center of a mask with twenty-eight light-dark line pairs per millimeter. FIG. 12 below shows the result of optical simulations of the MTF for various angular positions on the image plane.

The exemplary simulation 1200 illustrated in FIG. 12 indicates (at a criteria of twenty-eight line-pairs per millimeter) that near the center of the field the optical performance is adequate with better than a 70% modulation. Based on the MTF criteria and at the far corners of the field, performance is reduced to roughly 20% which, in some embodiments, may be inadequate. The result off-axis may be deceptive because the exemplary measurement approach described herein does not necessarily match the operating conditions in receiver system 100. In some embodiments, an alternative measurement method for this application plots the encircled energy diameters using geometric rays as described below.

FIG. 13 shows a radial energy plot 1300 for an exemplary select number of fields from the example described above. A four milliradian extent in object space would correspond to a 17.8-micron image spot diameter. Axial performance in this example is comfortably within the desired spot size with 100% of the energy. For the corner fields, the last 10% of the energy flares out and, if 90% energy criteria are used for our evaluation, the energy for all the fields is within approximately 35 microns. As such, an aperture window that is about 8 milliradians wide would capture 90% of the energy from this lens system.

In some embodiments, compensation for some additional defocusing of the receive beam image at the corners of the field may be performed. Spatial mask opening 402 can be enlarged adaptively based on a factory calibration to improve collection efficiency. Some degradation of signal-to-noise may occur if the total solid angle is increased significantly when spatial mask opening 402 is enlarged, but the impact would be small relative to the loss experienced due to spatial mask opening 402 being too small. As stated, spatial mask opening 402 size may be adaptive to the changing conditions.

Field of Coverage

FIG. 14 shows an exemplary field distortion of receiver lens assembly 702 in the receiver system 100. In some embodiments a significant amount of distortion may occur, and exemplary image grid 1400 shows a field of coverage of 30.5 degrees in Y and 15 degrees in X. This level of distortion may be compensated electronically by adjusting the shape and position of the mask openings (e.g., spatial mask opening 402) based on measured distortion during the factory calibration. Some distortion may be advantageous in the receiver system 100 because the distortion may result in less effective receive aperture compression moving off-axis in viewing angle.

Detector Signal Collection Path

FIG. 15 depicts chief ray diagram 1500 of the lower TIR prism 722 condenser reflector 724 along with DLP module 726 (e.g., DLP2010) and signal detector 116. This is an isolated view of detector signal path 1502. In some embodiments, the lower TIR prism 722 comprises an isosceles triangle with 22.75-degree vertices at the prism base and may be fabricated from HZLAF75D glass with a refractive index of approximately 1.882, and a DLP active state beam deviation angle of approximately 34 degrees. In some embodiments, the deviation angle may be in a range of approximately 30 degrees to 40 degrees. Condenser reflector 724 may be molded glass and may be glued to the right-side face of lower TIR prism 722 (adjacent back surface 1504 of condenser reflector 724 as shown) to direct upward rays downward to half-ball immersion lens 714 below. In some embodiments, half-ball immersion lens 714 may be a high-index sapphire. Condenser reflector 724 may be fabricated from a moldable glass HZLAF67D that comprises a closely matched refractive index to lower TIR prism 722 at 1.864. Back surface 1504 of condenser reflector 724 can be coated with passivated aluminum or gold or for maximum reflectivity a multilayer thin film. Signal detector 116 may be a surface mounted detector and may be mounted to the backside of half-ball immersion lens 714 and may be encapsulated to prevent any airgaps, which would cause TIR reflection losses at the backside of half-ball immersion lens 714. A top surface of half-ball immersion lens 714 may comprise an antireflection coated while the backside (side of signal detector 116) may be uncoated due to the use of plastic encapsulation between the back surface and signal detector 116.

Reflector Implementation Options

Condenser reflector 724 as described herein may be chosen to allow fabrication and optical coatings to be processed independently from lower TIR prism 722. This approach has the advantage of allowing lower TIR prism 722 to be fabricated from a very high-index glass using standard grinding and polishing methods. Back surface 1506 of condenser reflector 724 quality may not be critical due to its use in the non-imaging light collection path of signal detector 116, allowing back surface 1506 to be processed using standard optical molding with minimal post processing.

In some embodiments, condenser reflector 724 may be a reflective volume hologram adhesively applied to the right-side face of the lower TIR prism 722 adjacent back surface 1504 as shown in FIG. 15. The Lidar system associated with receiver system 100 may operate with a narrow optical spectrum in the near infrared allowing the use of a volume hologram with a reflective efficiency approaching 90% and with optical power allowing similar focusing performance to the glass of condenser reflector 724. This approach comprises somewhat lower reflectivity than the embodiments described above but may come at a lower cost and allow an additional reduction in size of lower TIR prism 722.

Receiver Contrast Modeling

In some embodiments, contrast performance of receiver system 100 may be one of the most critical factors in achieving optimum performance in bright sunlight. As described herein, contrast refers to the ratio of solar radiation collected in the passing areas of DLP mask (e.g., pass-state mirrors 120) to the portion that is leaked over the full area of the DLP module 726 in its dump state (e.g., dump-state mirrors 118). The pass-state mask opening size may be carefully selected to be large enough to ensure collection of the full signal during the beam scan while being as narrow as possible to minimize the viewed solid angle. Solid angle directly relates to solar background current and must be kept sufficiently low to achieve maximum receiver sensitivity.

Mask Opening Solid Angle: $4*\sin^{-1}(\sin(0.6°/2)*\sin(5°/2))$ or 7.4e-4 srad

Solid angle of the full DLP field: $4*\sin^{-1}(\sin(30/2)*\sin(60/2°))$ or 0.5 srad In this exemplary embodiment, the ratio of the mask opening solid angle to that of the full field is 0.5/7.4e-4 or 675:1. For this contrast ratio, the DLP area around the pass-state mirrors 120 would contribute roughly an equal amount of solar background to that collected in the pass-state 126, assuming a uniform background field. This is likely a very conservative assumption, so a contrast of 500:1 may be assumed to be sufficient to maintain desired performance. Modelling of the stray light of receiver system 100 has shown that proper lens antireflection coatings and placement of absorptive coatings may be critical to achieving desired contrast.

Figure 16:
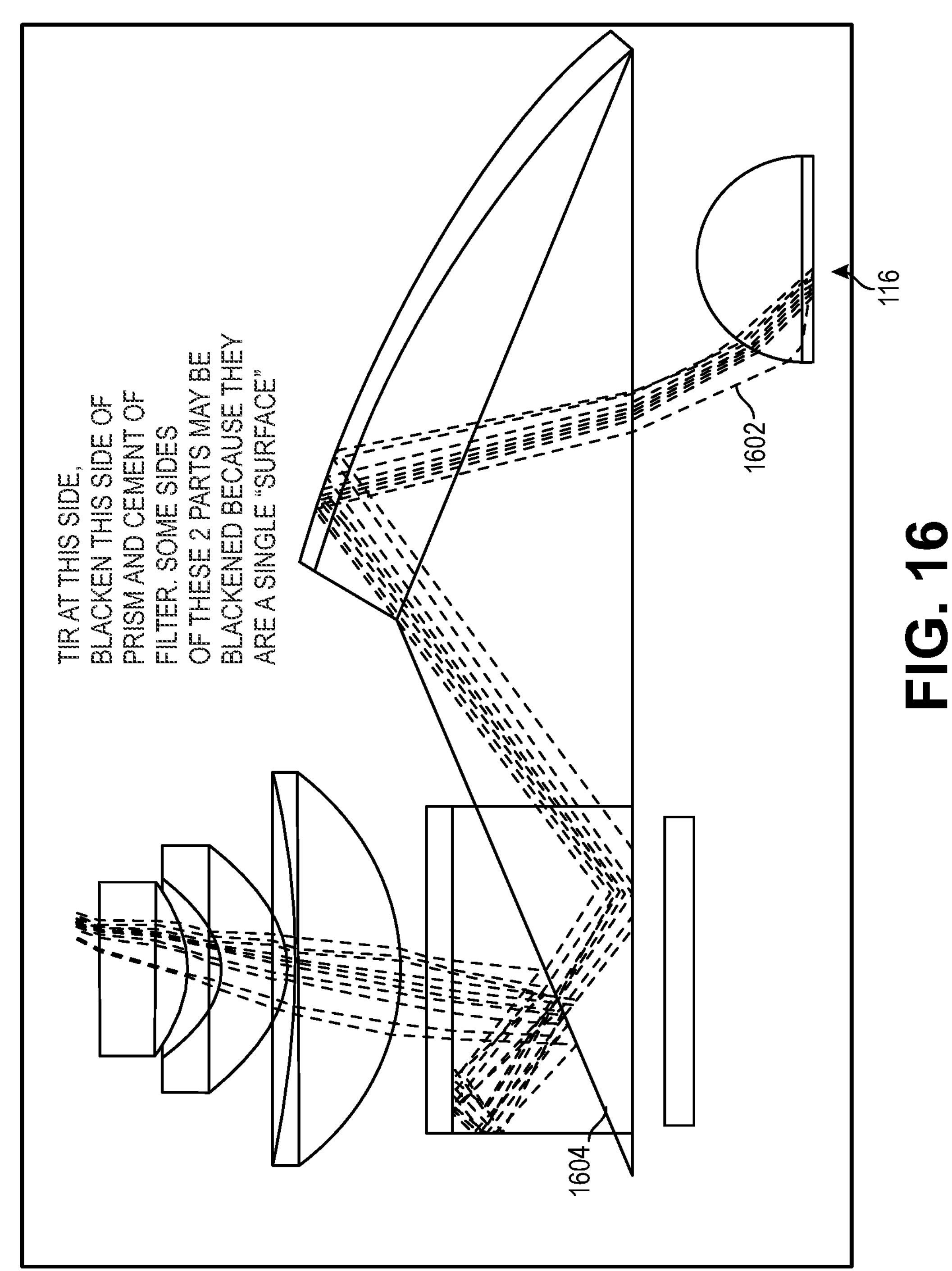
FIG. 16 depicts an unexpected stray light path that effectively bypasses the DLP.

FIG. 16 illustrates an unexpected stray light path 1602 that effectively bypasses the DLP and allows light to pass directly to the signal collection detector (i.e., signal detector 116). An example of targeting the location for the application of an absorptive coating is shown. To prevent light reflecting off of upper air gap 1604 between the upper and lower halves of the TIR prism pair 704 from passing directly to the signal detector, a coating on the side of upper TIR prism 720 may be necessary. With anti-reflective coatings and the addition of absorptive paint in targeted regions, a contrast of close to 2000:1 is expected. These results indicate that a 500:1 contrast ratio is achievable.

Receiver Packaging

Figure 17:
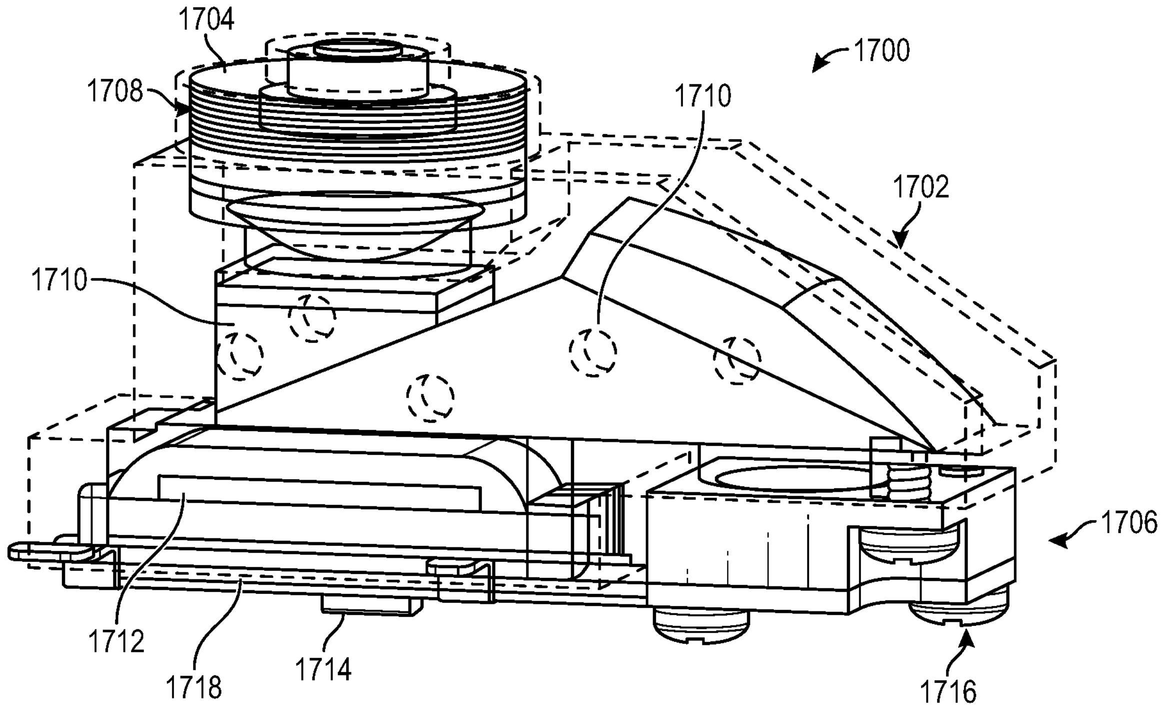
FIG. 17 depicts a side view of the receiver package.

FIG. 17 shows a side view 1700 of the receiver system 100 with main housing 1702 and receiver lens cell 1704 shown as partially transparent. The mechanical elements comprise main housing 1702 with DLP and lens cell mounting features, receiver lens cell 1704 and adjustable detector and immersion lens mount 1706.

The primary function of main housing 1702, in some embodiments, is to hold the TIR prism pair 704 and condenser reflector 724 in place relative to the receiver lens cell 1704 and detector and immersion lens mount 1706. Glue points 1710 along the length of main housing 1702 may allow firm attachment of the optical prism stack. A loose, course threaded bore 1708 at the top of main housing 1702, as shown in this example, allows receiver lens cell 1704 to be positioned in X, Y and Z axes relative to the DLP module 1712 mounted below. Optionally, a fine thread can be used to provide z-axis manipulation while cell mounting plate 1714 provides X and Y degrees of freedom. After alignment of receiver lens cell 1704, receiver lens cell 1704 may be glued in place.

Detector and immersion lens mount 1706 may attach to the bottom of main housing 1702 on a right side and has provisions for X, Y and Z adjustment to allow maximizing return signal strength after receiver lens cell 1704 and DLP module 726 are aligned. Prior to lens mount alignment, half-ball immersion lens 714 may be visually aligned to the center of the signal detector 116. Receiver PCB 1716 may be attached to the bottom of detector and immersion lens mount 1706 and may move with detector and immersion lens mount 1706 during the alignment process. A flex cable 1718 may be used to allow receiver PCB 1716 to move freely with detector and immersion lens mount 1706. The DLP module 1712 may be mounted and glued into a well on the bottom of main housing 1702 and a flex circuit with mating connector mounts to DLP module 726 with attaching force maintained using a spring clip.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following.

The invention claimed is:

1. A lidar receiver system, comprising:
- a telecentric receiver lens;
- a total internal reflection (TIR) prism assembly, comprising:
  - an upper right-angle wedge prism including an upper vertex angle;
  - an upper air gap;
  - a lower prism comprising:
    - a lower vertex angle less than 30 degrees, wherein the lower vertex angle is based at least in part on a f-number of the telecentric receiver lens, a material refractive index of a prism material of the lower prism, and an active state mirror deviation angle of a DLP micromirror array of a digital light projector (DLP) micromirror module;
  - a reflector adhesively bonded to an inclined face of the lower prism to direct propagating rays from upward to downward towards a bottom face of the lower prism,
  - wherein the lower prism is isosceles triangular shaped,
  - wherein the upper right-angle wedge prism includes an refractive index matching a lower refractive index of the lower prism;
- a lower airgap below a base surface of the lower prism;
- said DLP micromirror array configured to direct selected portions of a visual field off-axis towards the inclined face of the lower prism,
- wherein the selected portions include the propagating rays; and
- a photodetector configured to collect the propagating rays passing through the bottom face of the lower prism.

2. The lidar receiver system of claim 1,
- wherein the lower prism is configured to cause convergence of the propagating rays, thereby generating converging propagating rays, and
- wherein the photodetector incorporates a high index half ball shaped immersion lens to concentrate the converging propagating rays to an active region of the photodetector.

3. The lidar receiver system of claim 1, wherein the photodetector comprises an avalanche photodiode for added receiver gain and higher sensitivity.

4. The lidar receiver system of claim 3, wherein the avalanche photodiode is a single-photon avalanche diode (SiPM).

5. The lidar receiver system of claim 1, wherein the reflector is fabricated from high index molded glass with a reflected surface.

6. The lidar receiver system of claim 5, wherein the reflector comprises a plurality of asymmetric radiuses of curvature.

7. The lidar receiver system of claim 1, wherein the reflector is a volume hologram.

8. The lidar receiver system of claim 1, wherein the lower vertex angle of the lower prism is 22.75 degrees based on a receive lens F-number of approximately 1.8, a DLP active state beam deviation angle of approximately 34 degrees and a prism refractive index of approximately 1.882.

9. The lidar receiver system of claim 1, wherein the photodetector is mounted to a supporting PCB and connected to receiver circuitry using a flex circuit allowing three-dimensional movement.

10. The lidar receiver system of claim 9, wherein the supporting PCB is attached to a translatable mounting element.

11. A lidar receiver system, comprising:
- a receiver lens;
- a total internal reflection (TIR) prism assembly, comprising:
  - an upper prism including an upper vertex angle and an upper refractive index;
  - a lower prism comprising:
    - a lower vertex angle less than 30 degrees, wherein the lower vertex angle is based at least in part on a f-number of the receiver lens, a lower refractive index of a prism material of the lower prism, and an active state mirror deviation angle of a digital light projector (DLP) micromirror module;
  - a reflector adhesively bonded to an inclined face to direct propagating rays towards a bottom face of the lower prism;
  - wherein the upper refractive index matches the lower refractive index;
- an airgap below a base surface of the lower prism;
- a digital light projector (DLP) micromirror array configured to direct selected portions of a visual field off-axis towards the inclined face of the lower prism, wherein the selected portions including the propagating rays; and a photodetector configured to collect the selected portions of the visual field passing through the bottom face of the lower prism.

12. The lidar receiver system of claim 11, wherein the lower prism is configured to cause convergence of the propagating rays, thereby generating converging propagating rays, and wherein the photodetector incorporates a high index half ball shaped immersion lens to concentrate the converging propagating rays to an active region of the photodetector.

13. The lidar receiver system of claim 11, wherein the reflector is fabricated from high index molded glass with a reflected surface, is a volume hologram, or comprises a plurality of asymmetric radiuses of curvature.

14. The lidar receiver system of claim 11, wherein the airgap is a lower airgap; and further comprising an upper airgap disposed between a first lens and a second lens.

15. The lidar receiver system of claim 11, wherein the photodetector comprises an avalanche photodiode for added receiver gain and higher sensitivity.

16. The lidar receiver system of claim 15, wherein the avalanche photodiode is a single-photon avalanche diode (SiPM).

17. A lidar receiver system, comprising:

a receiver lens;

a prism assembly, comprising:

an upper prism including an upper vertex angle and an upper refractive index;

a lower prism comprising:

a lower vertex angle less than 30 degrees, wherein the lower vertex angle is based at least in part on a f-number of the receiver lens and a lower refractive index of a prism material of the lower prism;

a reflector adhesively bonded to an inclined face of the lower prism to direct propagating rays towards a bottom face of the lower prism;

a digital light projector (DLP) micromirror array configured to direct selected portions of a visual field, including the propagating rays, towards the inclined face of the lower prism; and a photodetector configured to collect the selected portions of the visual field passing through the bottom face of the lower prism.

18. The lidar receiver system of claim 17, wherein the photodetector incorporates a high index half ball shaped immersion lens to concentrate the propagating rays to an active region of the photodetector.

19. The lidar receiver system of claim 17, wherein the reflector is fabricated from high index molded glass with a reflected surface, is a volume hologram, or comprises a plurality of asymmetric radiuses of curvature.

20. The lidar receiver system of claim 17, wherein the photodetector comprises an avalanche photodiode for added receiver gain and higher sensitivity.

* * * * *